US009901076B1

(12) United States Patent
Tucker et al.

(10) Patent No.: US 9,901,076 B1
(45) Date of Patent: Feb. 27, 2018

(54) EXERCISE WHEEL FOR SMALL ANIMALS

(71) Applicant: Atticworx, Inc., Mims, FL (US)

(72) Inventors: Charles L. Tucker, Mims, FL (US);
Anita R. Tucker, Mims, FL (US)

(73) Assignee: Atticworx, Inc., Mims, FL (US)

( * ) Notice: Subject to any disclaimer, the term of this patent is extended or adjusted under 35 U.S.C. 154(b) by 0 days.

(21) Appl. No.: 15/616,754

(22) Filed: Jun. 7, 2017

Related U.S. Application Data

(60) Provisional application No. 62/347,278, filed on Jun. 8, 2016.

(51) Int. Cl.
*A01K 15/02* (2006.01)

(52) U.S. Cl.
CPC .......... *A01K 15/027* (2013.01); *A01K 15/02* (2013.01)

(58) Field of Classification Search
CPC ...... A01K 15/027; A01K 15/02; A63B 19/02; A63B 19/04; A63B 69/0028
USPC .................................. 119/700–704; 446/237
See application file for complete search history.

(56) References Cited

U.S. PATENT DOCUMENTS

| | | | | |
|---|---|---|---|---|
| 528,066 A * | 10/1894 | Ariens | ................ | A01K 15/027 119/700 |
| 1,794,951 A * | 3/1931 | Freer | .................... | A01K 15/027 119/700 |
| RE18,273 E * | 12/1931 | Freer | | |
| 3,057,328 A * | 10/1962 | Swartz | .................. | A01K 1/035 119/467 |
| 3,682,477 A * | 8/1972 | Harkins | ............... | A01K 15/027 119/700 |
| 3,788,277 A * | 1/1974 | Willinger | ............ | A01K 15/027 119/700 |
| 5,088,446 A * | 2/1992 | Campiotti | ............. | A01K 1/031 119/421 |
| 5,649,503 A * | 7/1997 | Woolfolk | ............. | A01K 15/027 119/700 |
| 6,412,443 B1 * | 7/2002 | Miller | .................. | A01K 15/025 119/700 |
| 7,770,539 B1 * | 8/2010 | Zimmerman | ........ | A01K 15/027 119/700 |

(Continued)

FOREIGN PATENT DOCUMENTS

JP         2006288289      * 10/2006

OTHER PUBLICATIONS

Xmount, Jul. 27, 2013. AtticWorx, http://atticworx.com:80/xmount.htm (Year: 2013).*

(Continued)

*Primary Examiner* — Christopher P Ellis
*Assistant Examiner* — Magdalena Topolski
(74) *Attorney, Agent, or Firm* — Brian S. Steinberger; Law Offices of Brian S. Steinberger, P.A.

(57) ABSTRACT

Devices, apparatus, systems and methods for providing a double bearing, not noisy, injection molded rotatable exercise wheels for small animals, including marsupium's such as sugar gliders, as well as mice, rats, gerbils and dwarf hamsters, and the like, with no exposed mounting hardware. The exercise wheels can have a netted running surface which safely holds animals in the wheels, and allows for waste to fall out from the wheels. The wheel can be supported by a U shaped stand over a flat surface. The wheel can be attached to an inside of a cage by a cross mount having hooks.

18 Claims, 17 Drawing Sheets

(56) References Cited

U.S. PATENT DOCUMENTS

| | | | |
|---|---|---|---|
| 2003/0056735 A1* | 3/2003 | Hull | A01K 15/02 119/702 |
| 2005/0087145 A1* | 4/2005 | Bordelon | A01K 13/00 119/600 |
| 2008/0141946 A1* | 6/2008 | Kalani | A01K 15/027 119/700 |
| 2011/0162586 A1* | 7/2011 | Ho | A01K 15/027 119/704 |

OTHER PUBLICATIONS

Matsumoto, Exercise Wheel for Small Animals, JP 2006288289 English translation (Year: 2006).*

Attic Worx Stealth Story, retrieved from https://web.archive.orglweb/20080421152151/http://atticworx.com:80/atticworxproducts.htm, Apr. 20, 2008, 3 pages.

Attic Worx, Our Products, retrieved from https://web.archive.org/web/20080420184400/http://atticworx.com:80/atticworxproducts.htm, Apr. 20, 2008, 3 pages.

Attic Worx, Our Products, retrieved from https://web.archive.org/web/20080521092649/http://atticworx.com:80/atticworxproducts.htm, May 21, 2008, 2 pages.

Attic Worx, Our Products, retrieved from https://web.archive.org/web/20090611211511/http://atticworx.com:80/atticworxproducts.htm, Jun. 11, 2009, 4 pages.

Attic Worx, Stealth Wheels, retrieved from https://web.archive.org/web120110110044640/http://atticworx.com:80/atticworxproducts.htm, Jan. 10, 2011, 3 pages.

Attic Worx, Stealth Wheels, retrieved from https://web.archive.org/web/20120616083729/http://atticworx.com:80/atticworxproducts.htm, Jun. 16, 2012, 3 pages.

Attic Worx, Stealth Wheel Junior, retrieved from https://web.archive.org/web/20120617042020/http://atticworx.com:80/atticworxproducts.htm, Jun. 17, 2012, 2 pages.

Attic Worx, Stealth Wheels, retrieved from https://web.archive.org/web/20130525130834/http://atticworx.com:80/atticwonxproducts.htm, May 25, 2013, 3 pages.

Attic Worx, X Mount Stand, retrieved from https://web.archive.org/web/20150223135828/http://atticworx.com:80/atticworxproducts.htm, Feb. 23, 2015, 3 pages.

Attic Worx, Magnum Wheels retrieved from https://web.archive.org/web/20150224003306/http://atticworx.com:80/atticworxproducts.htm, Feb. 24, 2015, 2 pages.

Attic Worx, X Mount Stand retrieved from https://web.archive.org/web/20160303084924/http://atticworx.com:80/atticworxproducts.htm, Mar. 3, 2016, 3 pages.

* cited by examiner

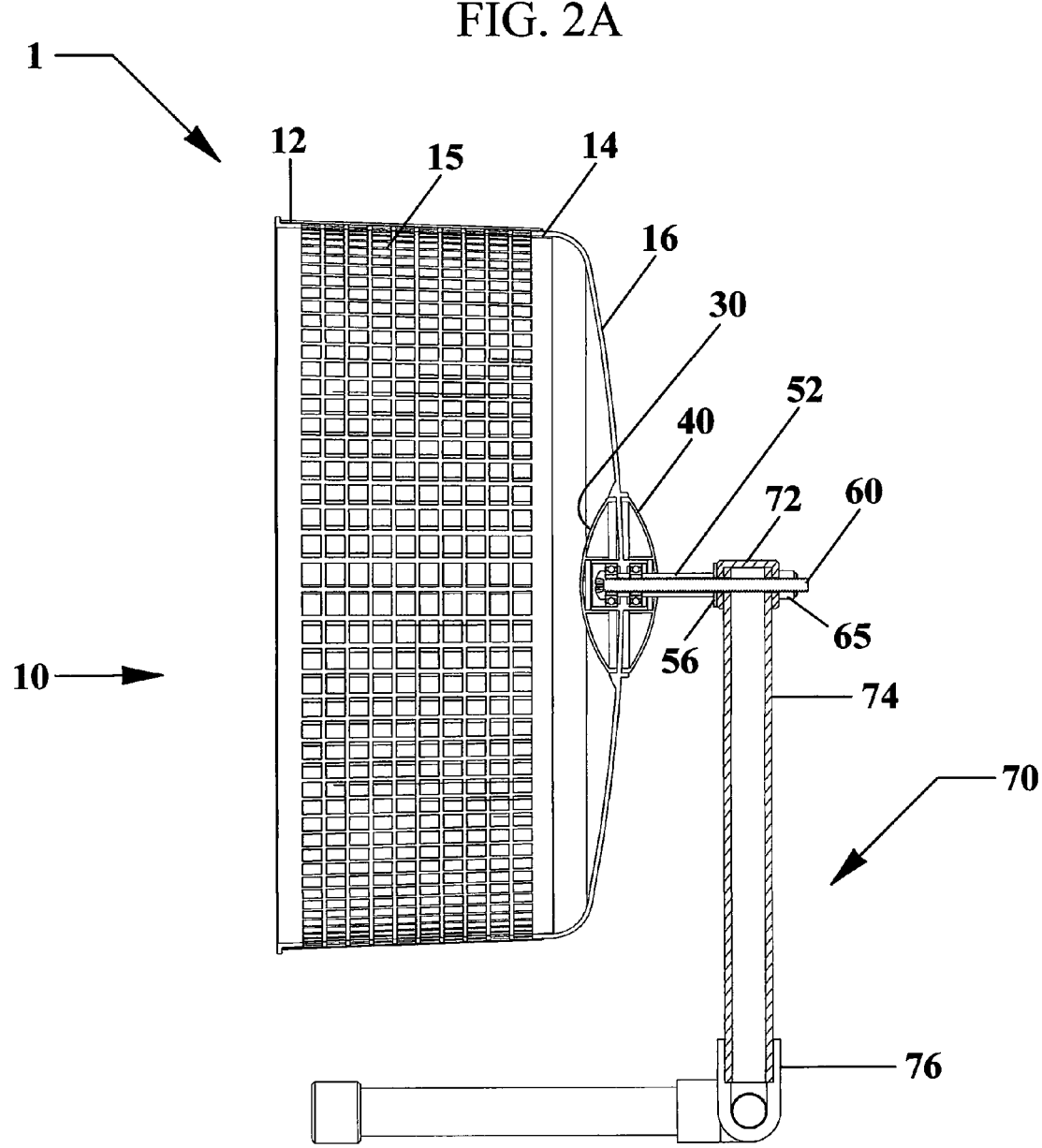

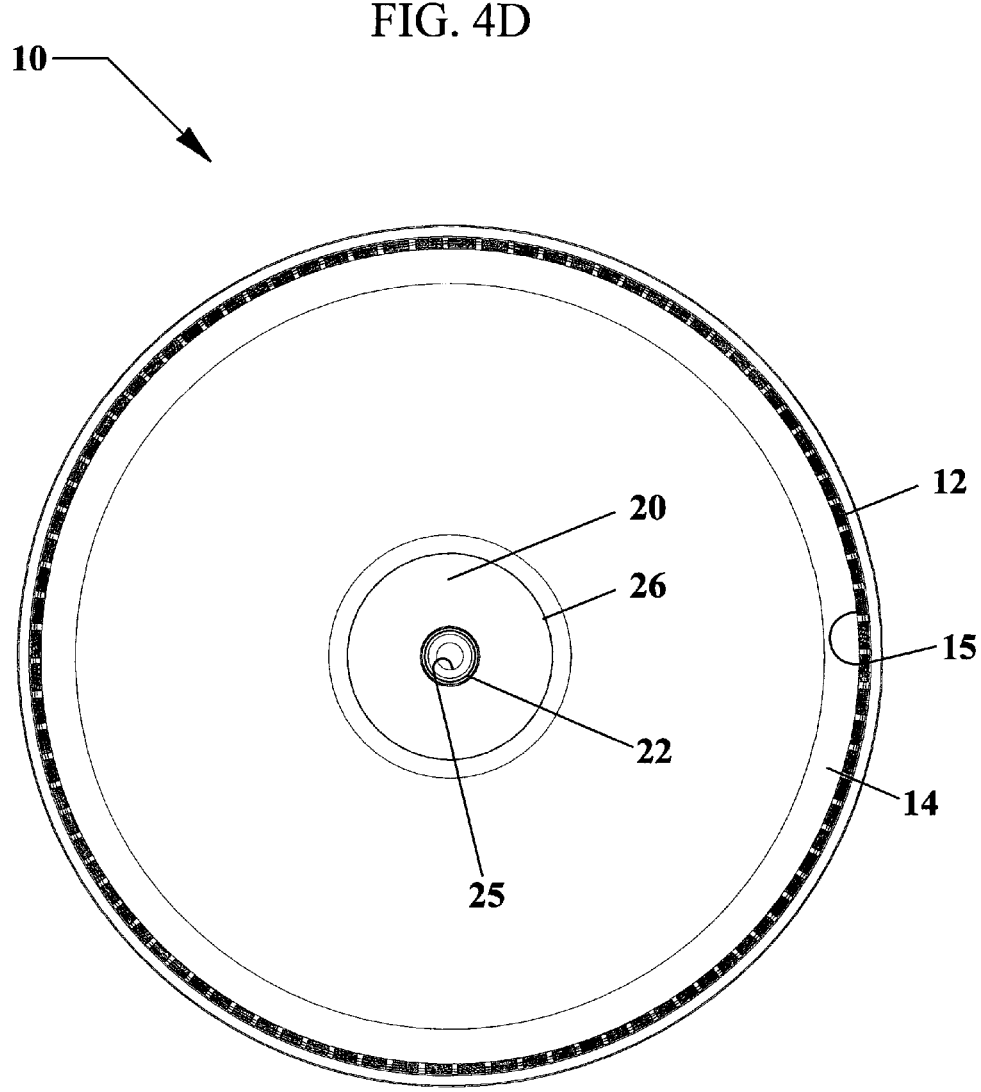

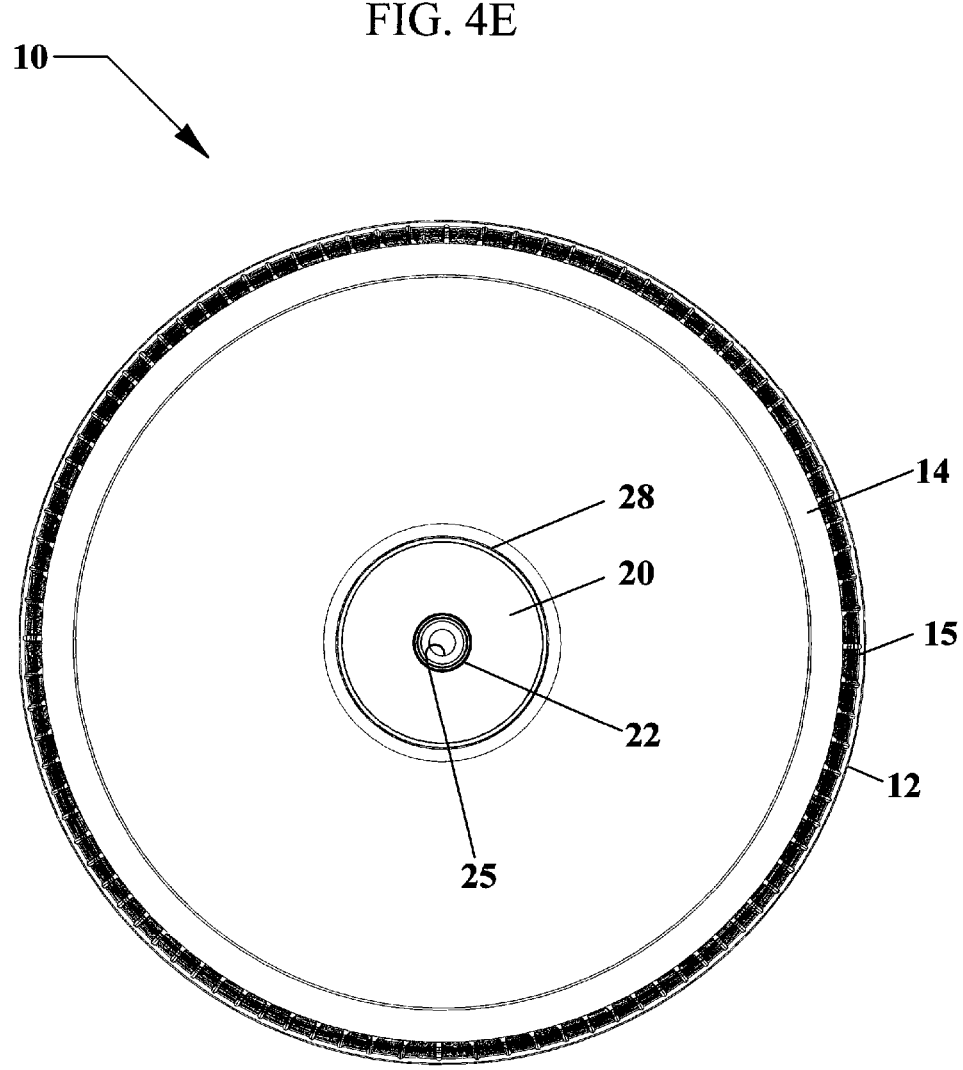

EXERCISE WHEEL FOR SMALL ANIMALS

CROSS REFERENCE TO RELATED APPLICATION

This application claims the benefit of priority to U.S. Provisional Application Ser. No. 62/347,278 filed Jun. 8, 2016, which is incorporated by reference in its' entirety.

FIELD OF INVENTION

This invention relates to small animals, and in particular to devices, apparatus, systems and methods for providing a double bearing, not noisy, injection molded exercise wheel for small animals, including marsupium's such as sugar gliders, as well as mice, rats, gerbils and dwarf hamsters, and the like, with no exposed mounting hardware, which safely holds animals within, and allows for waste to fall out.

BACKGROUND AND PRIOR ART

Exercise wheels have been used over the years that allow for small animals, including marsupium's such as sugar gliders, as well as mice, rats, gerbils and dwarf hamsters, and the like, to use, and have generally been metal type wheels, with exposed mounting hardware. However, these wheels have many problems. For example, many of these wheels are made from metal parts, coated with paint, that can wear off over time. The prior art wheels can often have cage type openings and cross-bars that can allow for feet, tails and legs to pass through that can result in harm to the small animals.

There are also safety issues with the prior art wheels. The floor type openings in these wheels and additional side openings can also cause the small pets to fall out of the rotating wheel and accidentally banging their heads on nearby shelves or types if the small animal tries to exit through the small holes as the wheel is spinning.

Additionally, most of these cage type wheels have exposed mounting hardware which results in the rotating wheel to generate squeaky noises not only during the day but all night long as the wheel is being rotated. As such, these prior art wheels can become both annoying and undesirable over time in view of the noise being generated by the rotating wheels.

Thus, the need exists for solutions to the above problems with the prior art.

SUMMARY OF THE INVENTION

A primary objective of the present invention is to provide devices, apparatus, systems and methods for providing a double bearing, non-noisy, injection molded exercise wheel with no exposed mounting hardware, for small animals, including marsupium's such as sugar gliders, as well as mice, rats, gerbils and dwarf hamsters, and the like, A secondary objective of the present invention is to provide devices, apparatus, systems and methods for providing an exercise wheel for small animals, having a net running surface to allow waste to fall through, keeping the animal paws clean, and being small enough so that feet, legs and tails of the animals remain safely inside the wheel.

A third objective of the present invention is to provide devices, apparatus, systems and methods for providing an exercise wheel for small animals, that is Veterinarian tested and approved.

The novel exercise wheel can have a semi-closed front so as to make the small animal pets feel secure. The running surface can be crossbar free to protect tails, feet and legs. The invention can use double bearings that can be sealed and be heavy duty and trouble-free with no exposed mounting hardware.

An exercise wheel and mount for small animals, can include a one-piece molded plastic wheel having a front ring and a rear wall with a cylindrical netted running surface therebetween, a separate stand for supporting the wheel upright rotatable position, and a rotation mechanism with a double bearing for allowing the wheel to be rotatable relative to the stand, where the wheel is useful as an exercising wheel for small animals.

The netted running surface can include openings between approximately 1/4 inch to approximately 5/16 inch, wherein the openings are large enough for animal waste to pass through and small enough to keep feet, legs and tails of the small animals in the wheel. The running surface can be approximately 4 inches wide.

The one-piece wheel can be formed from ABS plastic. The one-piece wheel can be formed from polypropylene plastic. The one-piece wheel can be formed from high density polyethylene (HDPE). The one-piece wheel is formed from nylon.

The exercise wheel can include a separate interior convex curved front cap inside of the wheel for attachment over a central axis in the rear wall; and a separate exterior rear cap outside of the wheel for attachment over the central axis in the rear wall, with the double bearing between the front cap and the rear cap.

The rotation mechanism can include a pair of stainless steel double bearings.

The rotation mechanism can include a first stainless steel bushing between the each of the stainless steel double bearings, and a second stainless steel bushing between the exterior cap and the stand.

The rear wall can include an outer convex raised shape to help prevent small animals from being trapped between the rear wall and the stand.

The rear wall can include a bevel shaped ring shaped edge, which is adjacent to a perimeter edge of the separate interior convex curved front cap inside of the wheel, for a smooth transition therebetween.

The stand can include a U shaped base with a post extending from the base to the rotation mechanism, wherein the stand supports the exercise wheel on a horizontal surface.

The U shaped base can include a vertical support post having an upper end attached to the rotation mechanism, and a lower end, attached to the U shaped base, a t coupler having an upper opening attached to the lower end of the support post, and having a pair of opposite facing side openings, a pair of rear support posts, each attached to the opposite facing side openings of the t coupler, a pair of elbow couplers, each attached to exposed ends of the rear support posts, and a pair of parallel support leg posts, each attached to the pair of elbow couplers.

The stand can include a cross mount for supporting the rotation mechanism against a vertical surface, wherein the stand supports the exercise wheel on a horizontal surface and hooks for attaching the cross mount to an inside of cage.

The cross mount can include a cross fitting, a first tube attached to a first opening of the cross fitting, a first cap attached to an end of the first tube, a first hook attached to the first cap, a second tube attached to a second opening of the cross fitting, a second cap attached to an end of the second tube and a second hook attached to the second cap.

The cross mount can further include a third tube attached to a third opening of the cross fitting, a third cap attached to an end of the third tube, a fourth tube attached to a fourth opening of the cross fitting and a fourth cap attached to an end of the fourth tube.

An exercise wheel and mount for small animals, can include a one-piece molded plastic wheel having a front ring and a rear wall with a cylindrical netted running surface therebetween, a stand for supporting the wheel upright rotatable position and a rotation mechanism for allowing the wheel to be rotatable relative to the stand, where the wheel is useful as an exercising wheel for small animals, a separate interior convex curved front cap inside of the wheel for attachment over a central axis opening in the rear wall, and a separate exterior rear cap outside of the wheel for attachment over the central axis opening in the rear wall.

The rear wall can include a bevel shaped ring shaped edge, which is adjacent to a perimeter edge of the separate interior convex curved front cap inside of the wheel, for a smooth transition therebetween.

The rear wall can include an outer convex raised shape to help prevent small animals from being trapped between the rear wall and the stand.

The rotation mechanism can include a pair of stainless steel double bearings, a first stainless steel bushing between the each of the stainless steel double bearings, and a second stainless steel bushing between the exterior cap and the stand.

Further objects and advantages of this invention will be apparent from the following detailed description of the presently preferred embodiments which are illustrated schematically in the accompanying drawings.

BRIEF DESCRIPTION OF THE FIGURES

FIG. 2A is a cross-sectional view of the exercise wheel and support of FIG. 1B along arrows 2X.

FIG. 4D is a front side view of the wheel of FIG. 4A.

FIG. 4E is a rear side view of the wheel of FIG. 4A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The novel exercise wheels can be used for small animals, including marsupium's such as sugar gliders, as well as mice, rats, gerbils and dwarf hamsters, and the like.

A LIST OF THE COMPONENTS WILL NOW BE DESCRIBED>

Figure 1A:
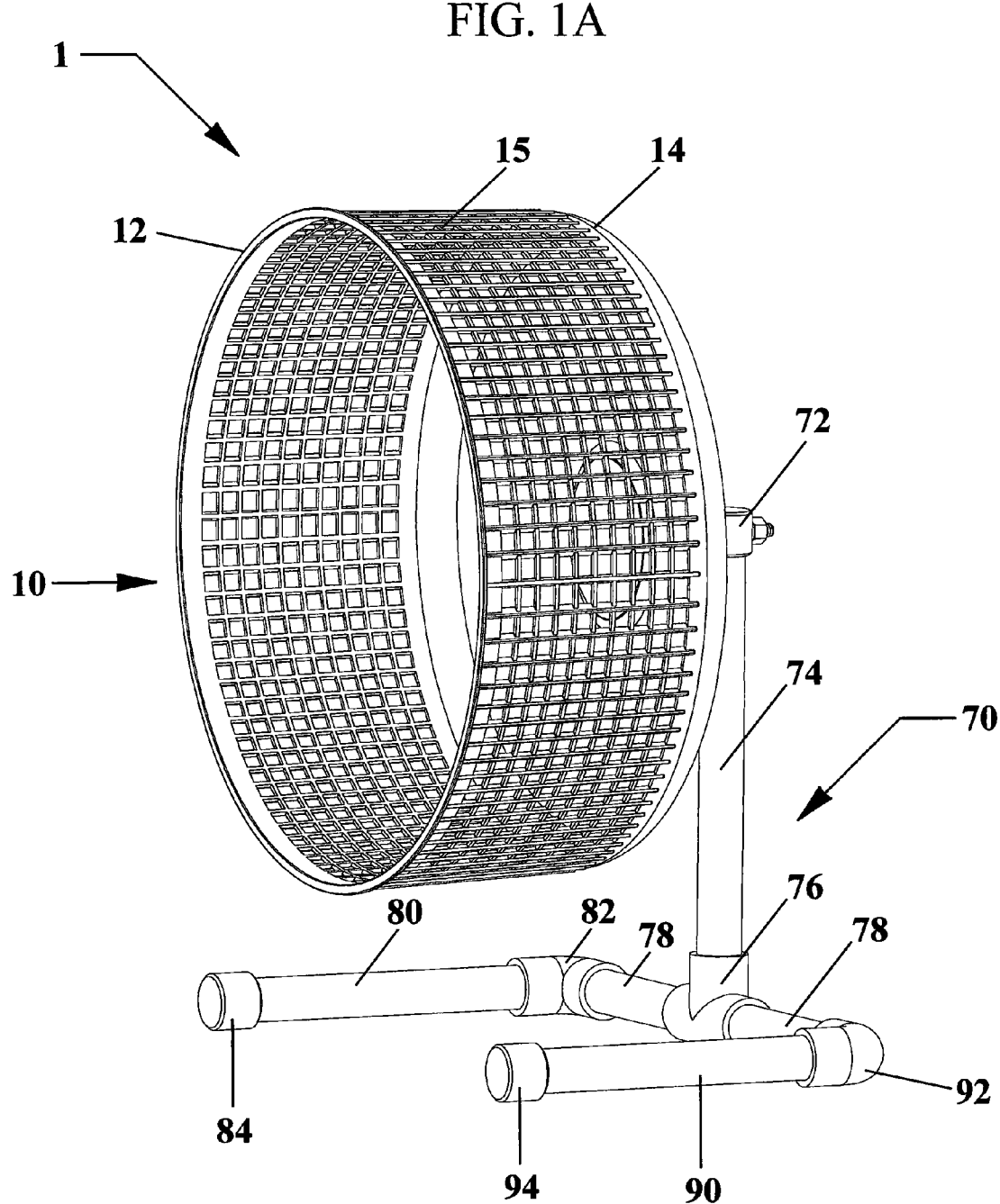
FIG. 1A is a front right perspective view of the exercise wheel and U shaped stand support.
Figure 1B:
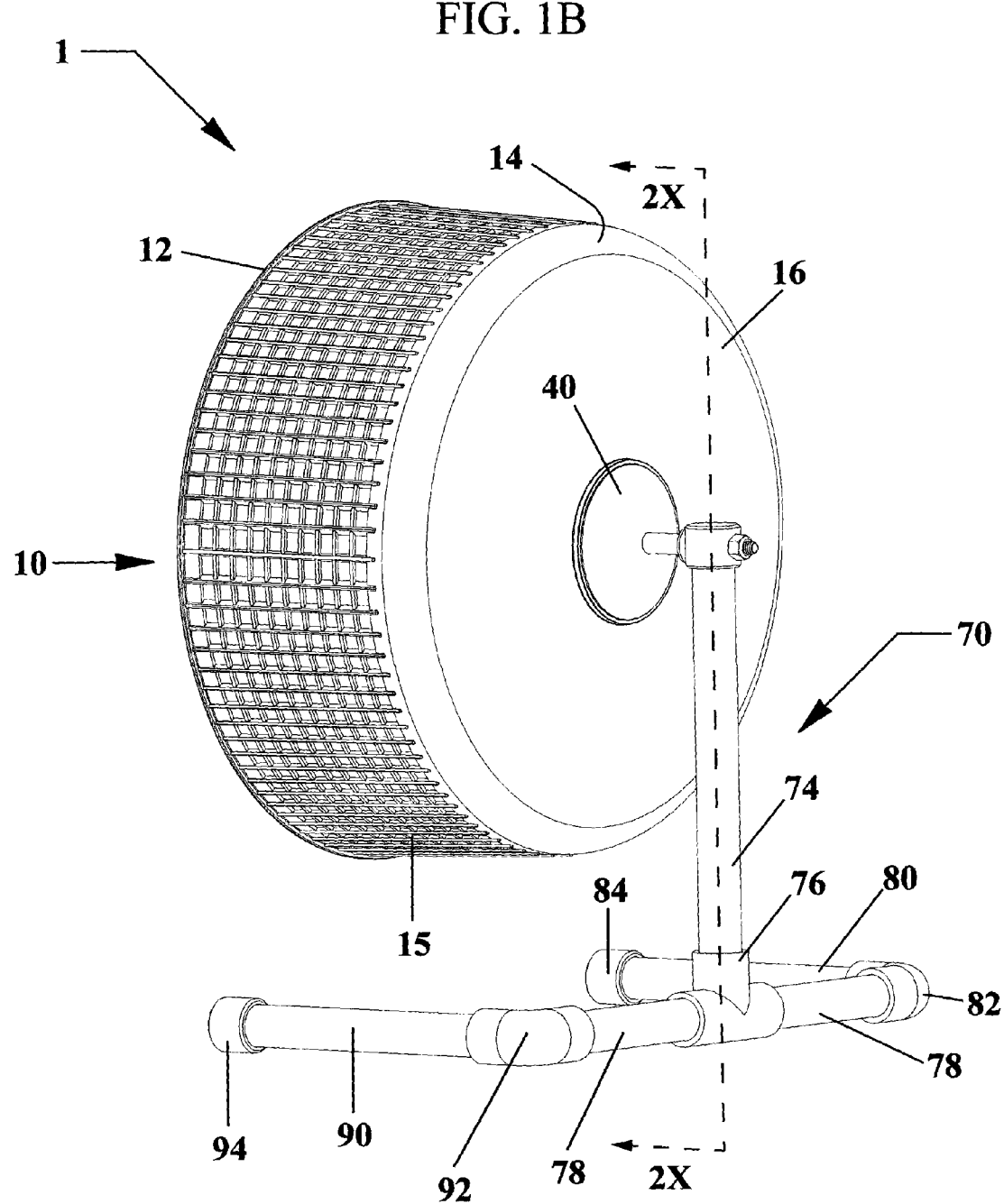
FIG. 1B is a rear left perspective view of the exercise wheel and stand support of FIG. 1A.

1 First embodiment exercise wheel and U shaped stand
10 wheel
12 front ring
14 rear ring
15 mesh
16 rear wall
20 hub disc
22 central cylinder through hub disc
25 small diameter opening
26 front raised perimeter beveled ring edge
28 rear raised perimeter edge
30 front cap
32 outer edge lip
34 cylinder portion
40 rear cap
42 outer edge lip 44 cylinder portion
45 center through-hole
50 bearing
52 large bushing such as stainless steel
54 small bushing such as stainless steel
56 washer such as stainless steel
60 fastener, such as bolt, screw and the like, such as stainless steel
65 nut
70 U shaped stand
72 top cap
74 main upright tube
76 T fitting
78 rear supports
80 left stand support tube
82 left elbow coupling
84 left stand end cap
90 right stand support tube
92 right elbow coupling
94 right stand end cap
100 Second embodiment exercise wheel with side cross mount
105 cross fitting
110 first cross tube
114 first end cap
116 first hook
120 second cross tube
124 second end cap
126 second hook
130 third cross tube
134 third end cap
140 fourth cross tube
144 fourth end cap First Embodiment FIG. 1A is a front right perspective view of a first embodiment 1 of the exercise wheel 10 and U shaped stand support 70. FIG. 1B is a rear left perspective view of the exercise wheel 10 and stand support 70 of FIG. 1A.

FIG. 2A is a cross-sectional view of the exercise wheel 10 and support 70 of FIG. 1B along arrows 2X.

Figure 2B:
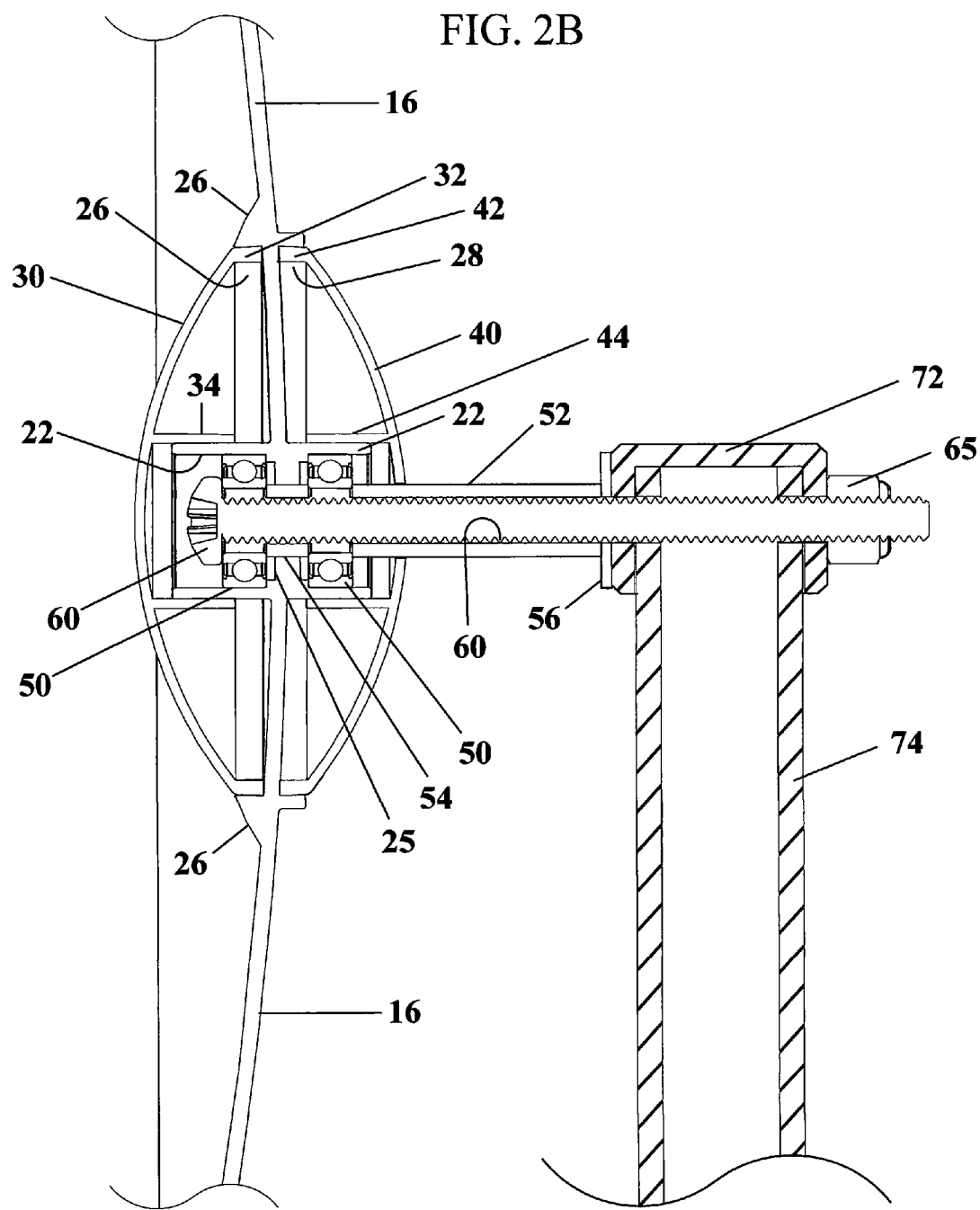
FIG. 2B is an enlarged view of the hub connections between the exercise wheel and support of FIG. 2A.

FIG. 2B is an enlarged view of the hub connections between the exercise wheel 10 and support 70 of FIG. 2A.

Figure 3:
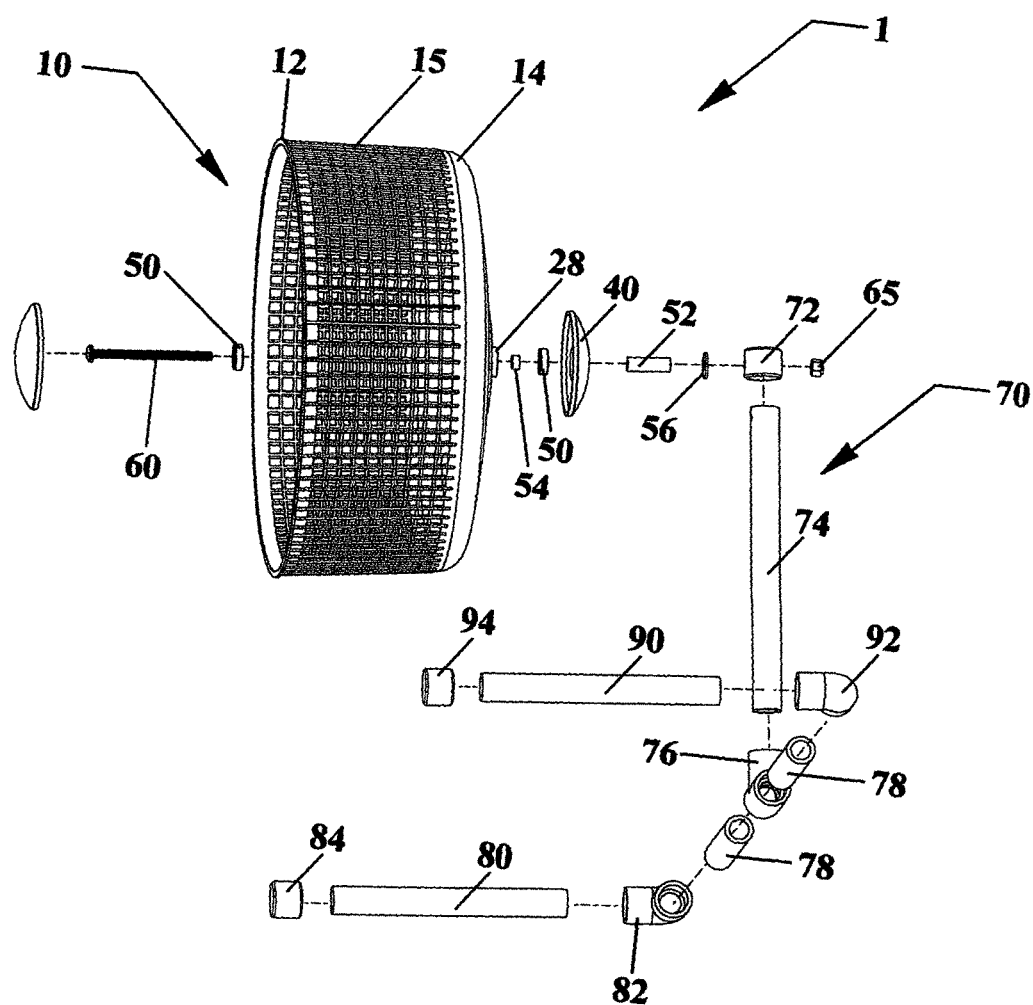
FIG. 3 is a perspective exploded right side view of the exercise wheel and support of the preceding figures.

FIG. 3 is a perspective exploded right side view of the exercise wheel 10 and support 70 of the preceding figures.

Figure 4A:
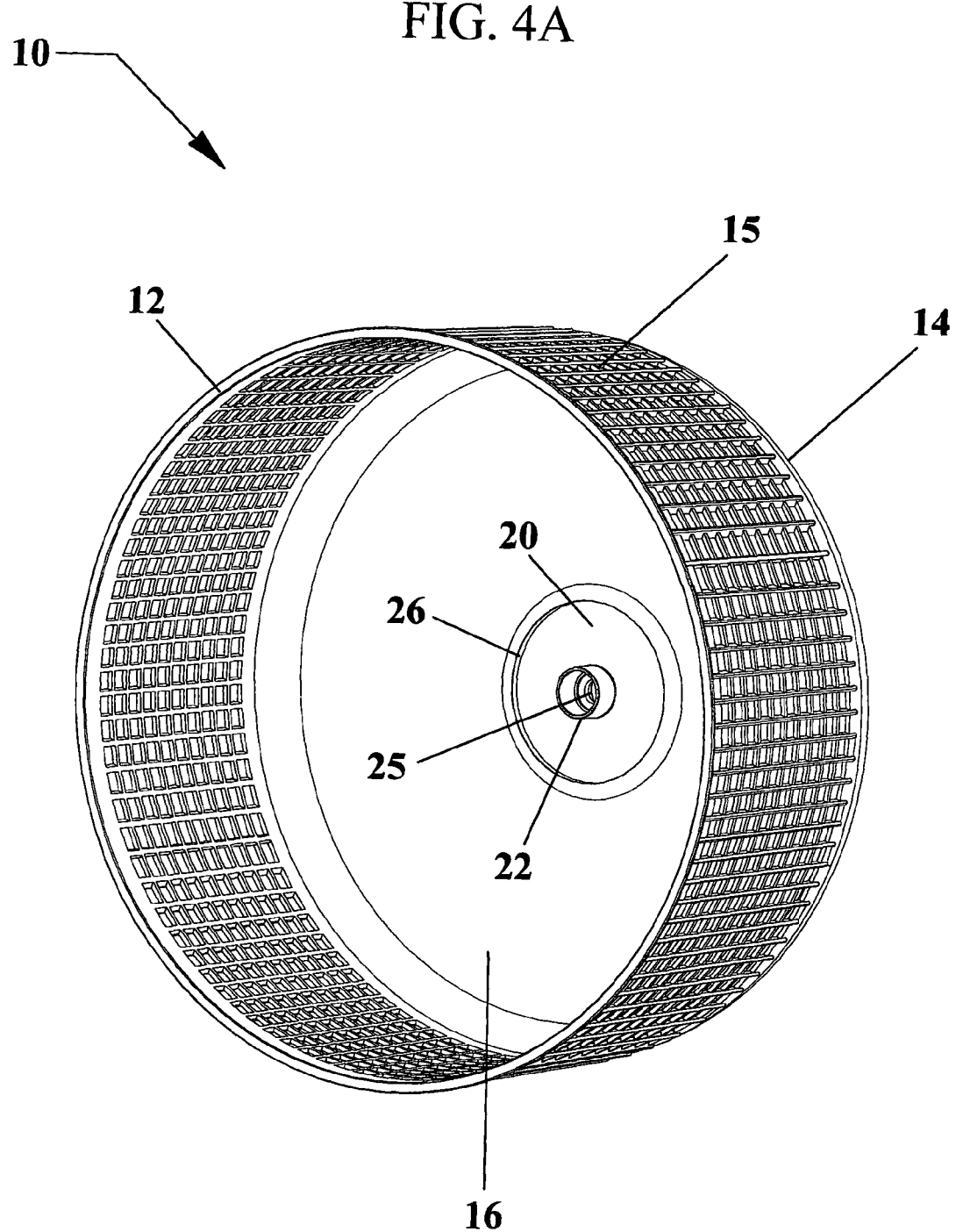
FIG. 4A is a front right perspective view of the wheel part of the exercise wheel and support of the preceding figures.
Figure 4B:
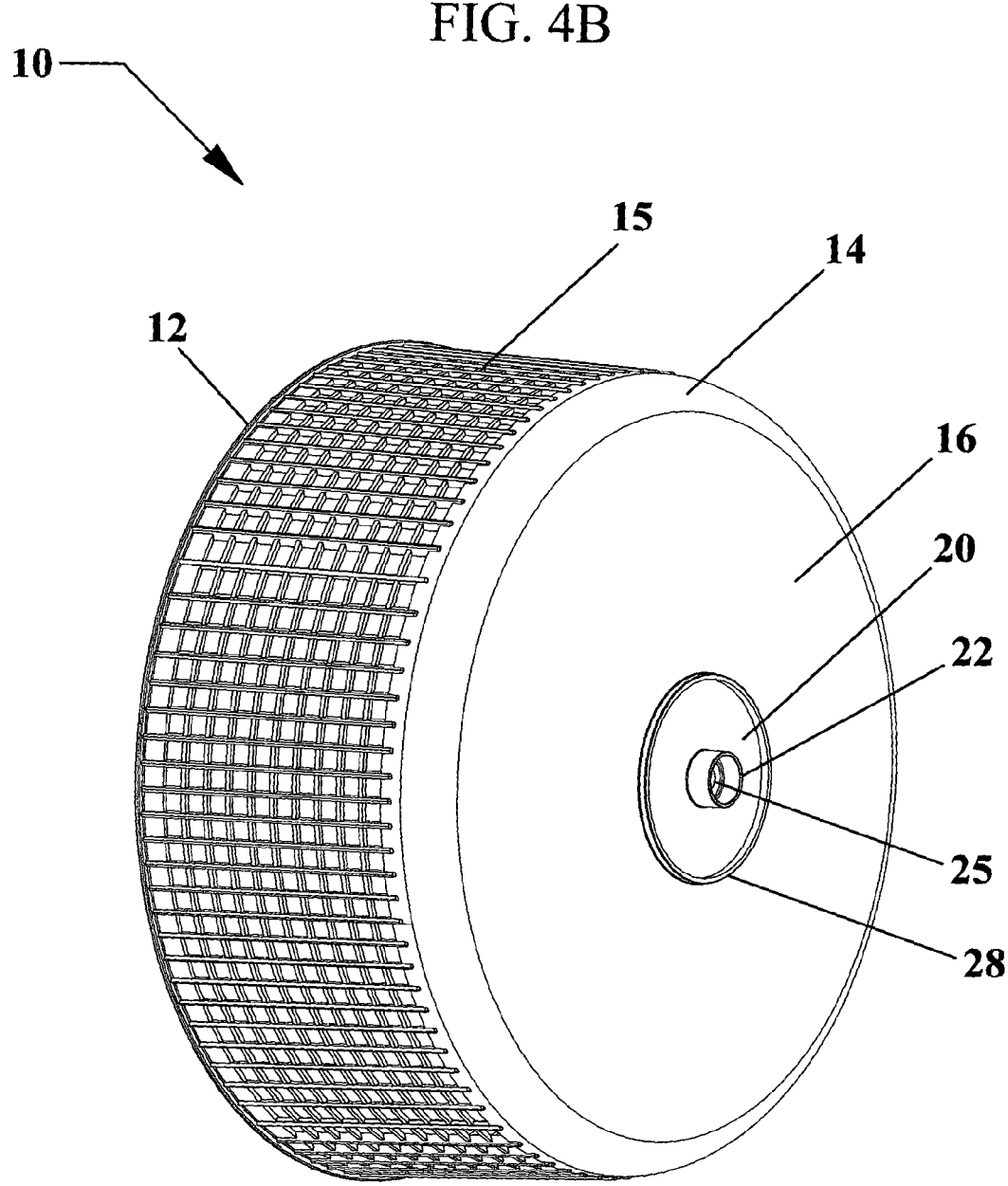
FIG. 4B is a rear left perspective view of the wheel of FIG. 4A.
Figure 4C:
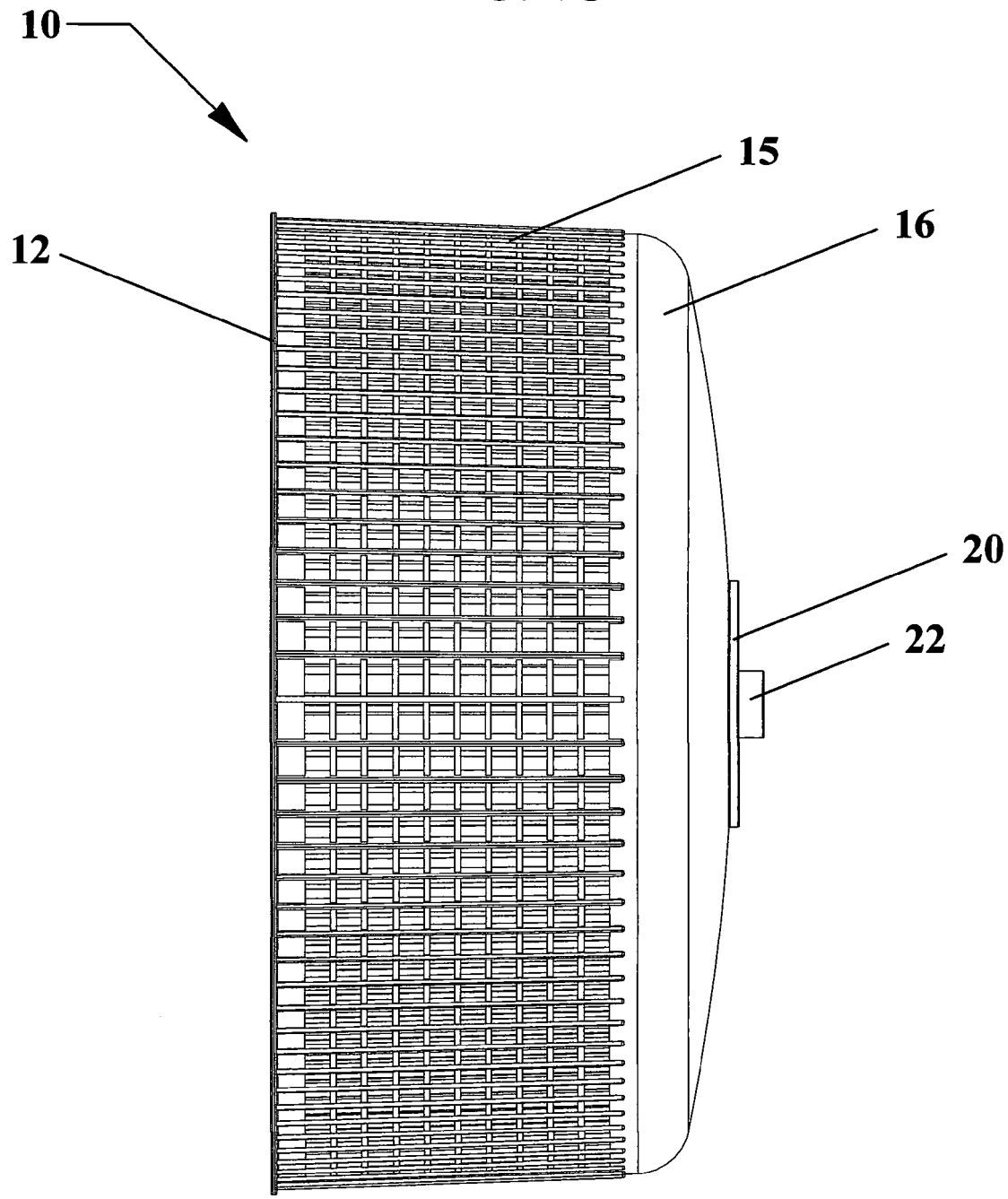
FIG. 4C is a right side view of the wheel of FIG. 4A.

FIG. 4A is a front right perspective view of the wheel 10 of the exercise wheel 10 and support 70 of the preceding figures. FIG. 4B is a rear left perspective view of the wheel 10 of FIG. 4A. FIG. 4C is a right side view of the wheel 10 of FIG. 4A. FIG. 4D is a front side view of the wheel 10 of FIG. 4A. FIG. 4E is a rear side view of the wheel 10 of FIG. 4A.

Figure 5A:
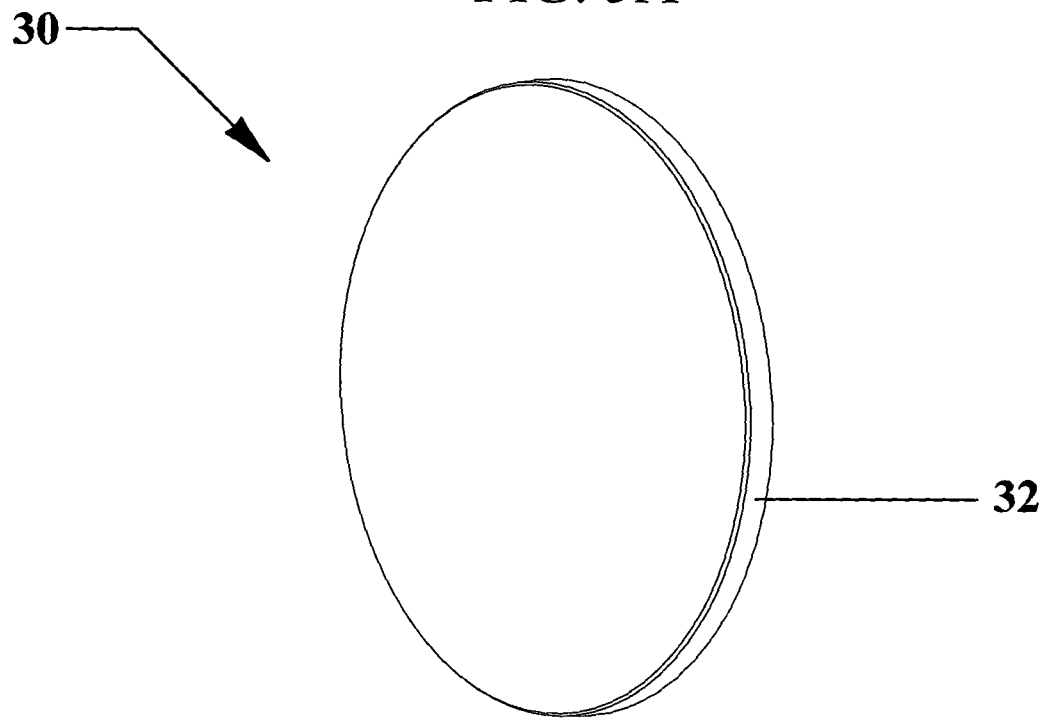
FIG. 5A is an enlarged front perspective view of the front cap for the exercise wheel and support of the preceding figures.
Figure 5B:
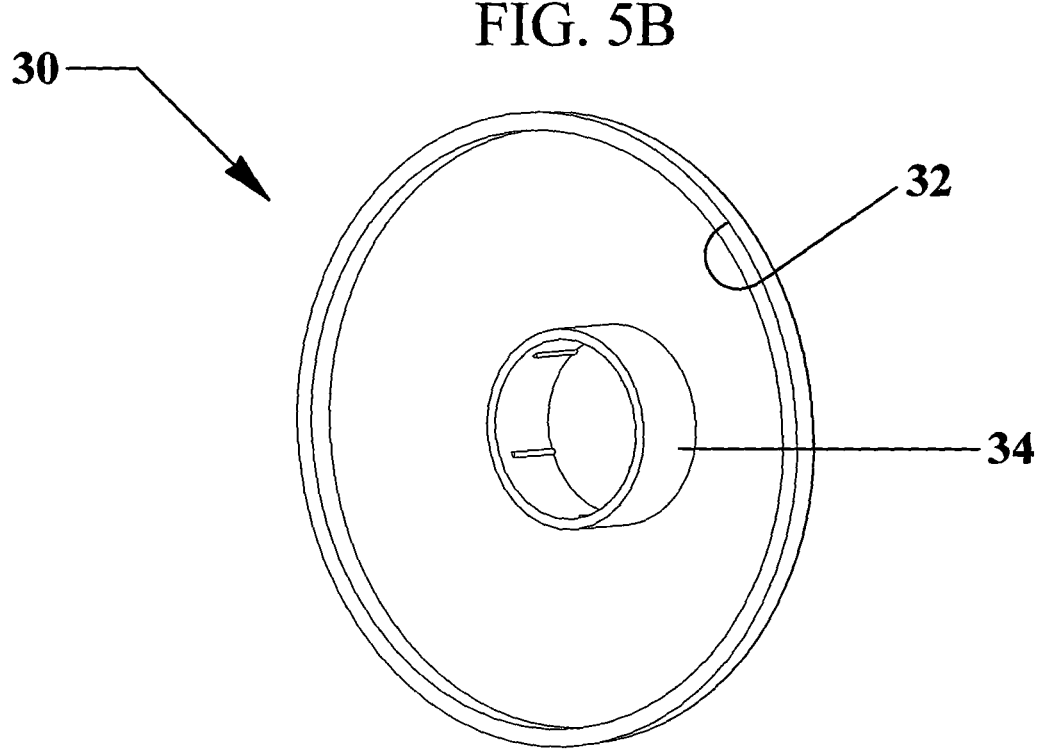
FIG. 5B is a rear perspective view of the front cap of FIG. 5A.

FIG. 5A is an enlarged front perspective view of the front cap 30 for the exercise wheel 10 and support 70 of the preceding figures. FIG. 5B is a rear perspective view of the front cap 30 of FIG. 5A.

Figure 6A:
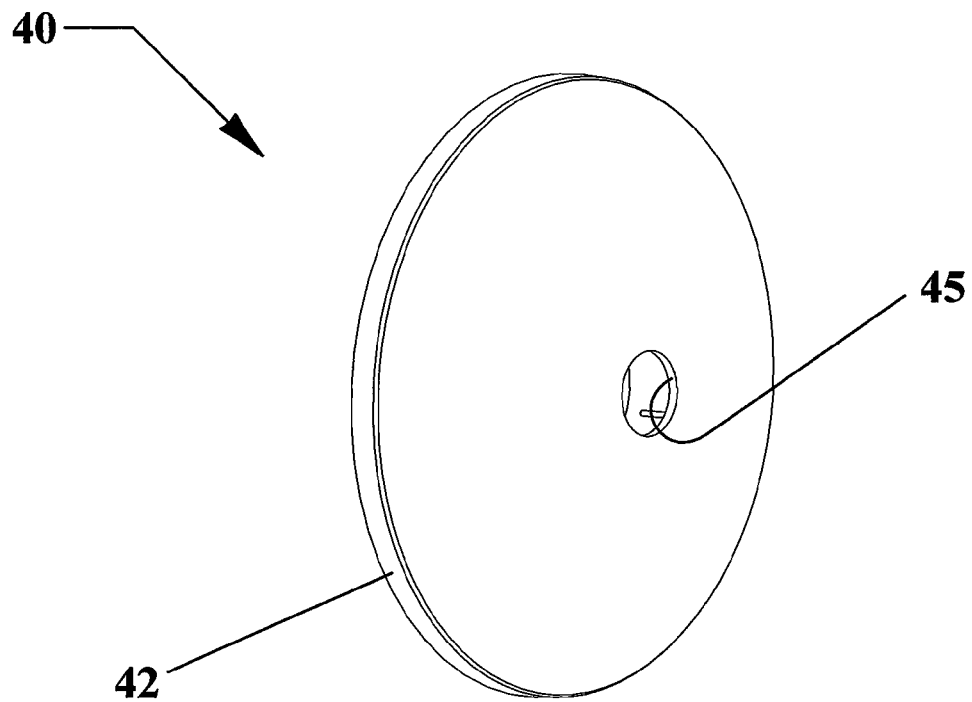
FIG. 6A is an enlarged front perspective view of the rear cap for the exercise wheel and support of the preceding figures.
Figure 6B:
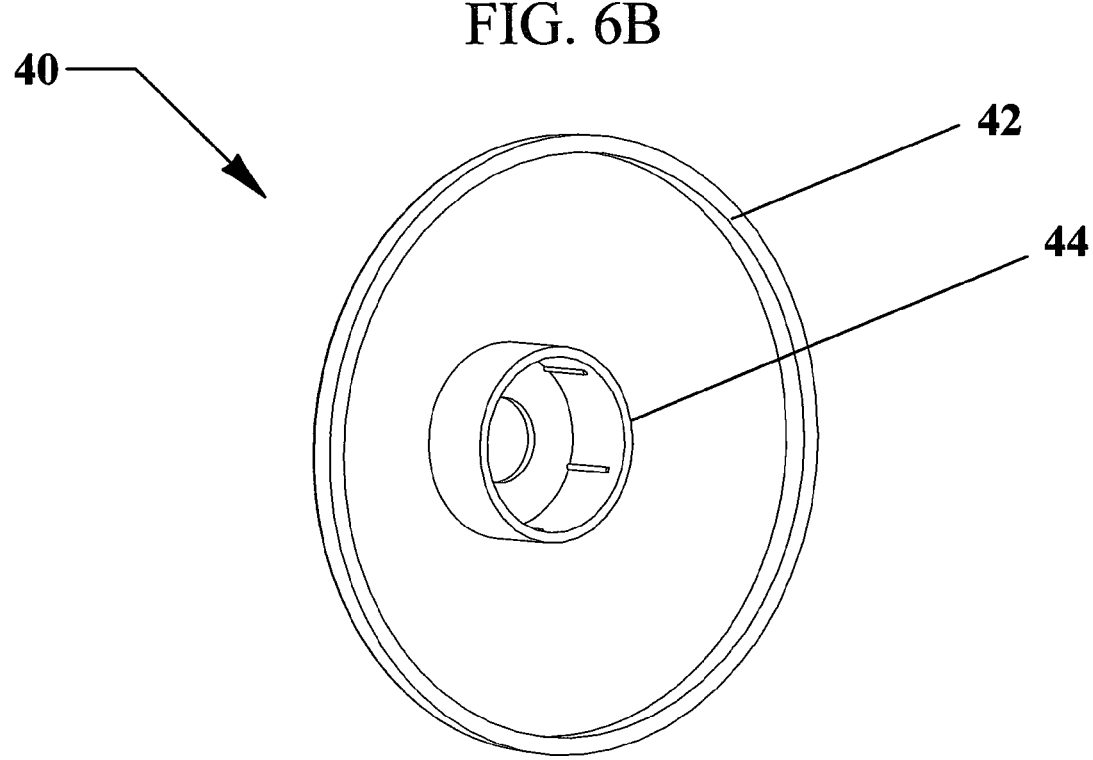
FIG. 6B is a rear perspective view of the rear cap of FIG. 6A.

FIG. 6A is an enlarged front perspective view of the rear cap 40 for the exercise wheel 10 and support 70 of the preceding figures. FIG. 6B is a rear perspective view of the rear cap 40 of FIG. 6A.

Figure 7:
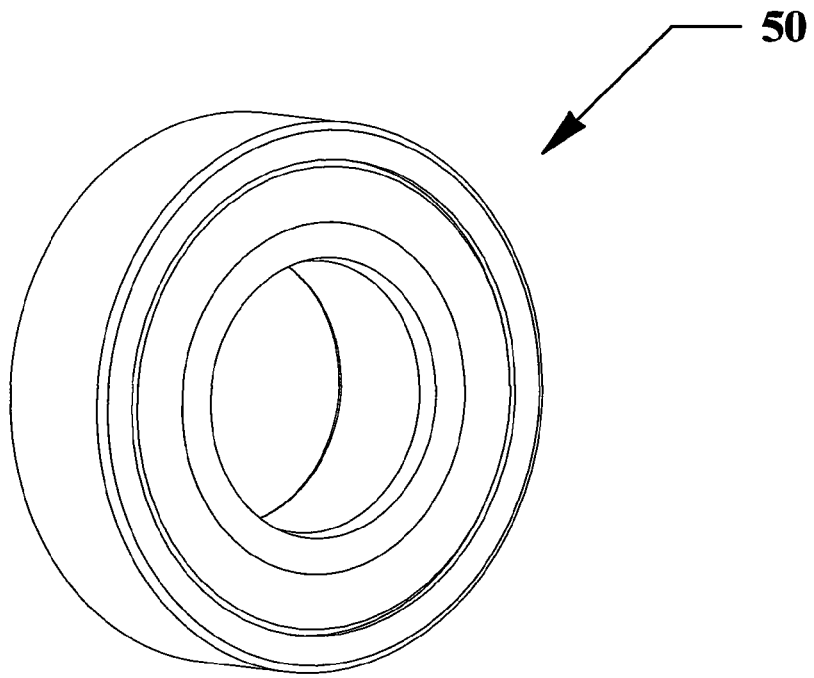
FIG. 7 is an enlarged perspective view of one of the bearings used in the hub connections between the wheel and stand of the preceding figures.

FIG. 7 is an enlarged perspective view of one of the bearings 50 used in the hub connections between the wheel 10 and stand 70 of the preceding figures.

Figure 8:
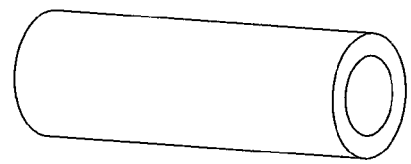
FIG. 8 is an enlarged perspective view of a bushing used in the hub connections between the wheel and stand of the preceding figures.

FIG. 8 is an enlarged perspective view of a large bushing 52 used in the hub connections between the wheel 10 and stand 70 of the preceding figures.

Referring to FIGS. 1A-8, the first embodiment 1 includes a wheel 10 and U shaped stand support 70. The wheel 10 can be preferably a one-piece injection molded wheel that includes a front ring 12 and rear back wall 16 with a cylindrical mesh 15 formed therebetween. The inside inner edge of the rear wall 16 where it meets the mesh 15 can have a concave ring shaped surface for strength.

A preferred embodiment of the wheel 10 can be formed from injection molded ABS plastic for its' strength and flowrate. Alternatively, the wheel can be formed from other plastic material, such as but not limited to polypropylene, high density polyethylene (HDPE), nylon, combinations, thereof, and the like.

The mesh openings can range from between approximately ¼ inch to approximately 5/16 inch.

The novel one-piece wheel 10 eliminates hiding places for waste to form and bacteria to form and grow, which occurs in the plural piece wheels of the prior art. The one-piece wheel 10 is easier and faster to clean than the plural piece wheels of the prior art.

The wheel 10 can have an open front with no cross members that restrict access onto the cylindrical mesh 15, and a rear wall 16 with a central hub disc portion 20 with raised beveled ring edge 26, and central cylinder 22 formed through the disc portion 22 with a smaller diameter opening 25 in the central cylinder 22 extending outward from both sides of the disc portion 22.

The raised beveled ring edge 26 allows for a smooth transition between convex raised cap 30 and the back plate portion of the rear wall 16, which can be useful to keep animal hair or an animal tail from getting snagged along the outer perimeter edge of the convex curved cap 30.

The mesh 15 can have a width of approximately 4 inches wide to provide a running surface. The wheel 10 can have an outer diameter at the open front end along ring 12 of approximately 12 and ⅞ inches. The rear wall 16 can have an outer diameter slightly less so that waste can run out the front open end of the wheel 10, as in a slight funnel effect. The degree opening from the rear wall 16 to the front end along front ring 12 can be approximately 2 degrees wider. The slight funnel shape of the wheel 10 allows for a plurality of one-piece wheel(s) 10 to be stacked inside of one another allowing for less storage space and for the wheel(s) to be easier to ship and transport.

Referring to FIGS. 2A to 6B, the front cap 30 can include an outer edge lip 32 which frictionally attaches about a front raised circular beveled ring edge 26 on the hub disc 20. The rear cap 40 can include an outer edge lip 42 which frictionally attaches about a rear facing raised circular edge 28 on the hub disc 20. Cylinder 34 on front cap 30 can frictionally fit about a front extending portion of central cylinder 22, and cylinder 44 can frictionally fit about a rearwardly extending portion of central cylinder 22.

Referring to FIGS. 2A to 6B, a pair of stainless steel double bearings 50 can sandwich about both sides of a smaller diameter opening 25 in the disc hub 20 and separated by a small bushing 54, such as a stainless steel bushing and the like. In a preferred embodiment, the double bearing(s) can include stainless steel and have an outer diameter (OD) of approximately ¾ inch, and an inner diameter (ID) of approximately ¼ inch, with two rubber seals.

To the rear of one of the bearings 50 can be a longer bushing 52, such as but not limited to another stainless steel bushing, and the like, which spaces the hub portions of the wheel 10 from the top of the stand 70. An elongated fastener 60 such as a bolt or screw can attach the wheel 10 into the top cap 72 on the main upright tube 74 of the stand 70, with a nut 65 on another side of the cap 72 and washer 56 on opposite side of the cap 72.

Referring to FIGS. 2A-2B, the rear wall 16 can have a generally convex shape facing the upright support tube 74 which can function as a safety feature so as to help prevent animals from becoming trapped in the space between the rear wall 16 and support tube 74.

Referring to FIGS. 1A-3, the U shaped stand 70 will now be described. The bottom of the main upright tube 74 can frictionally fit into the top of a T fitting 76. Rear support tubes 78 can attach into both sides of the T fitting 76. A left leg tube 80 can be attached to one of the rear support tubes 78 by a left coupler 82, and have an end cap 84 on the outer end of the left leg tube 80. A right leg tube 90 can be attached to another one of the rear support tubes 78 by a right left leg coupler 92 and have an end cap 94 on the outer end of the right left leg tube 90. The U shaped stand 70 can allow for the wheel 10 to be supported on any generally flat surface, such as a table top, countertop, shelf or floor. The U-shaped stand 70 components can be formed from PVC types pipes, and the like.

The novel exercise wheel can be used for travel cages, and can be used for small animals, such as marsupium's such as sugar gliders, as well as mice, rats, gerbils and dwarf hamsters, and the like, The wheel and stand can be approximately 11 & ½ inches tall, and be approximately 11½ inches tall, approximately 9½ inches wide, approximately 6 inches deep.

Second Embodiment Side Cross Mount

Figure 9A:
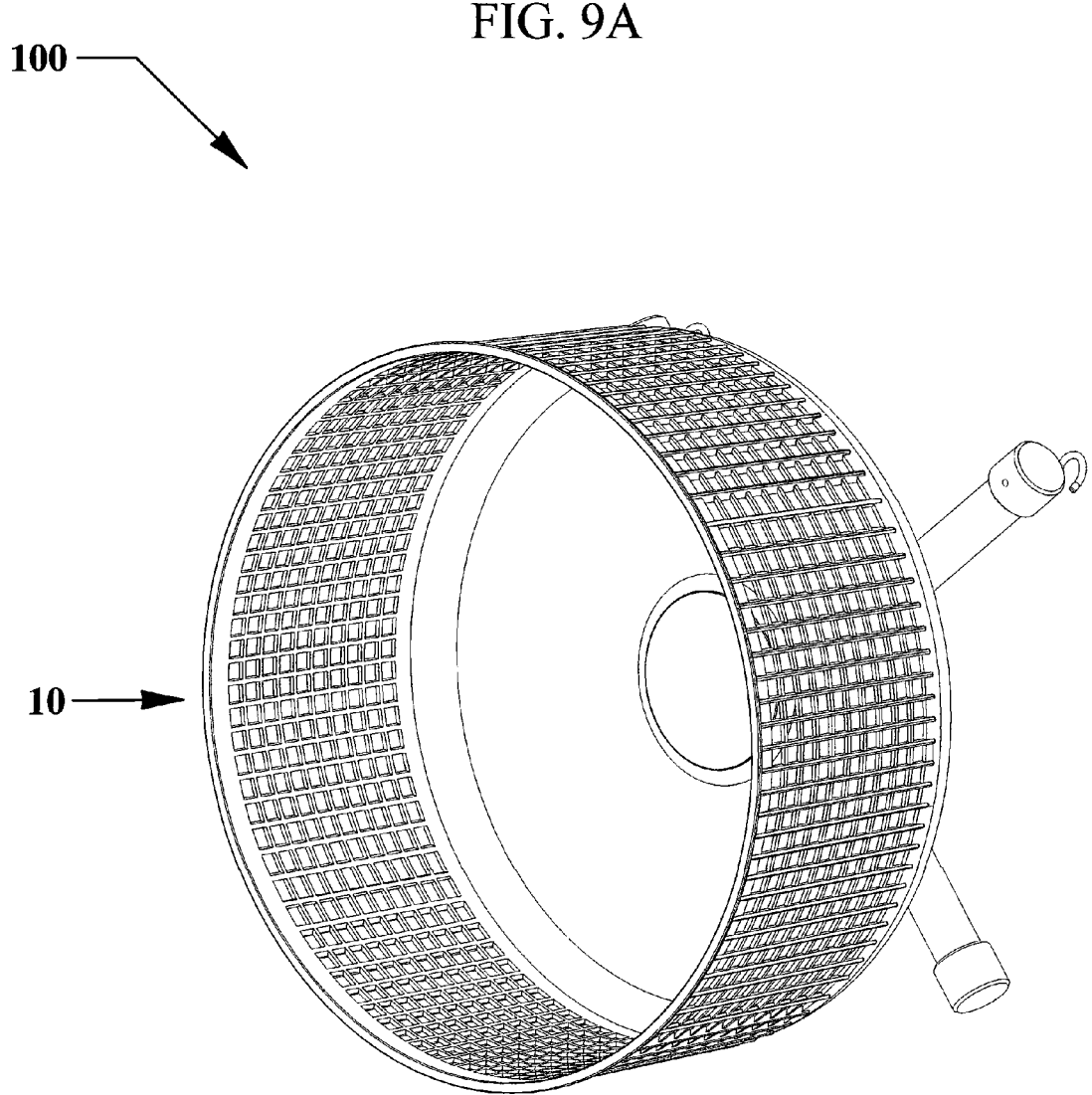
FIG. 9A is a front right perspective view of a second embodiment of the exercise wheel and cross mount stand.
Figure 9B:
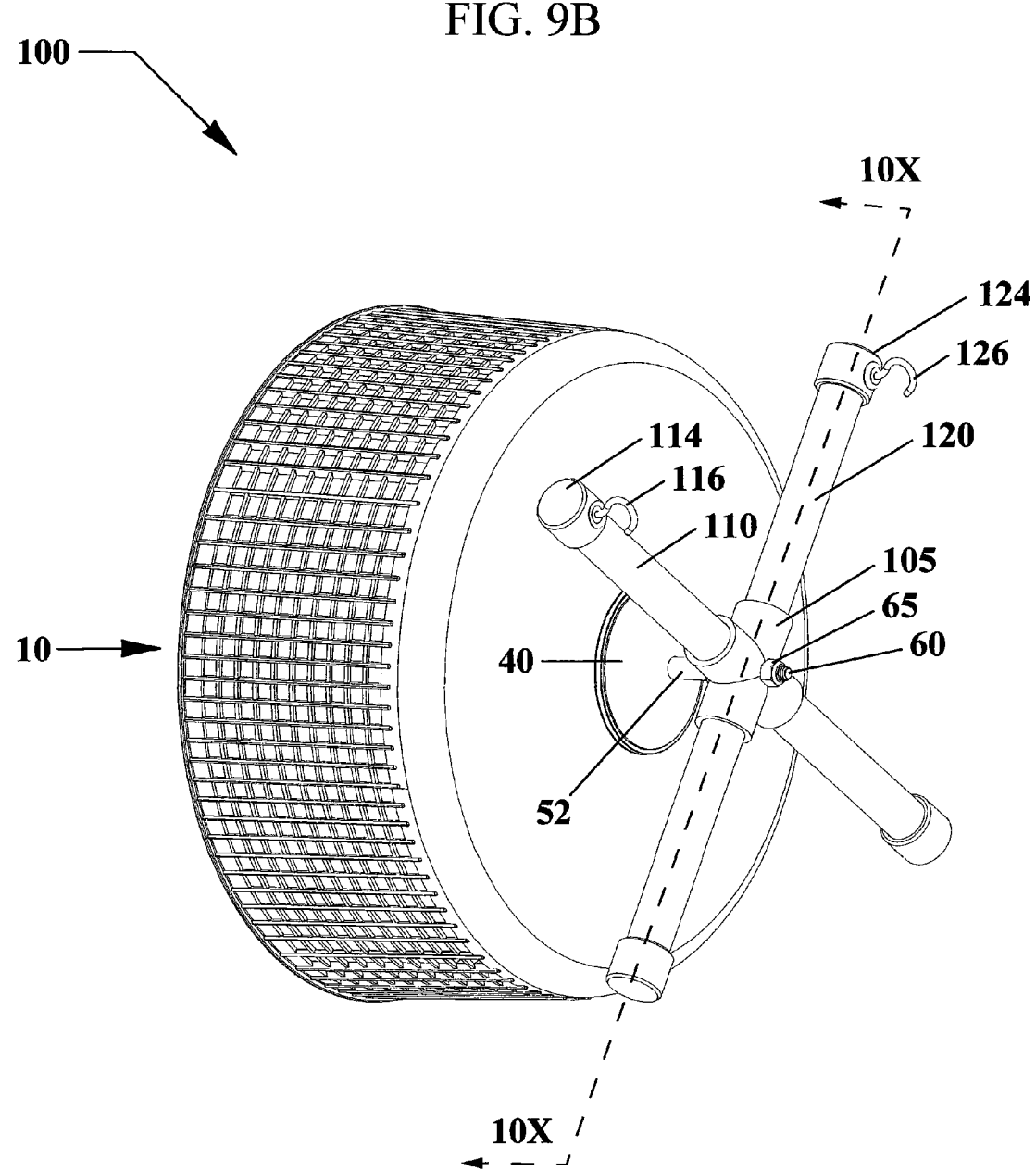
FIG. 9B is rear left perspective view of the exercise wheel and stand of FIG. 9A.
Figure 10:
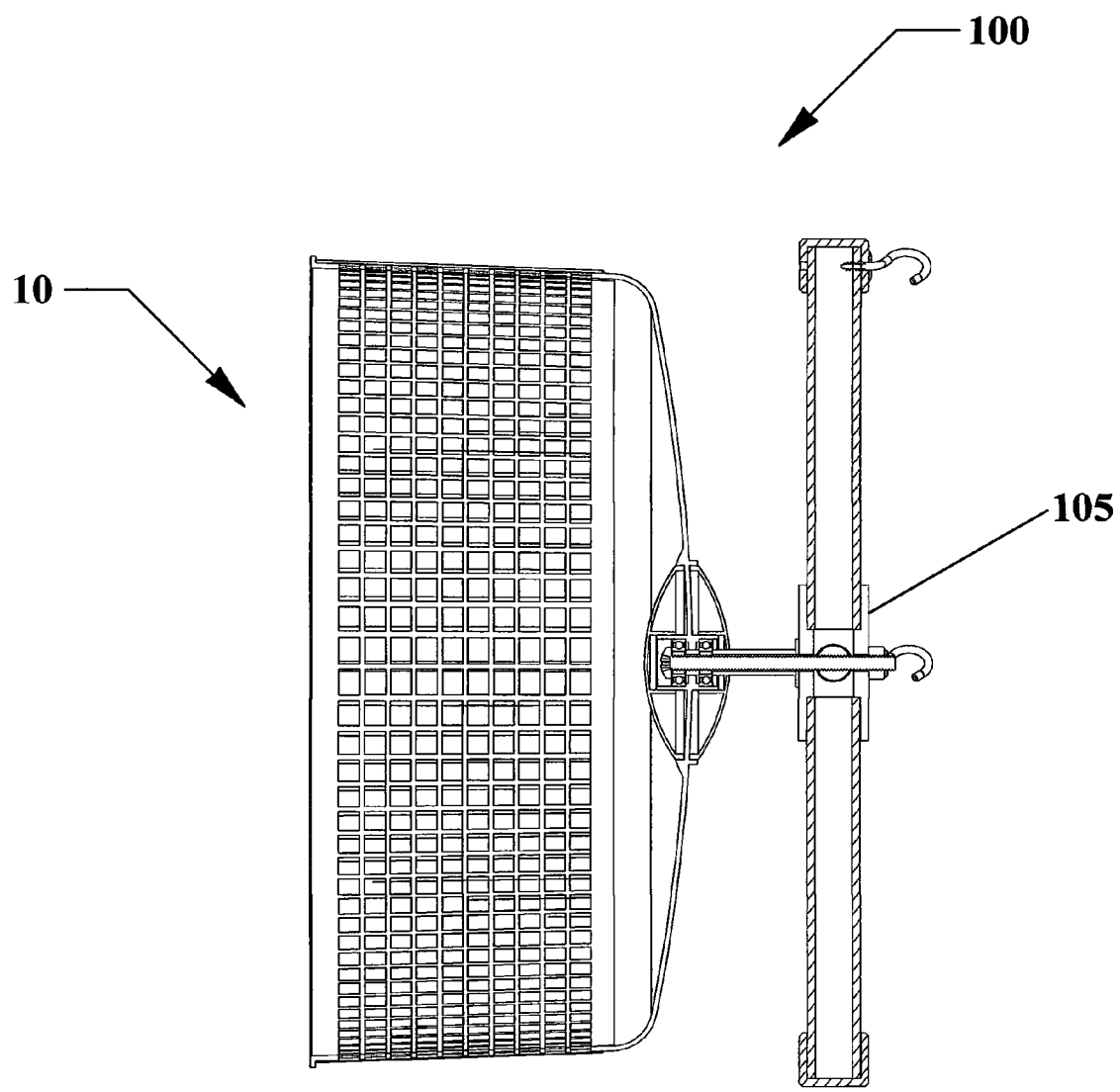
FIG. 10 a cross-sectional view of the exercise wheel and stand of FIG. 9B along arrows 10X.
Figure 11:
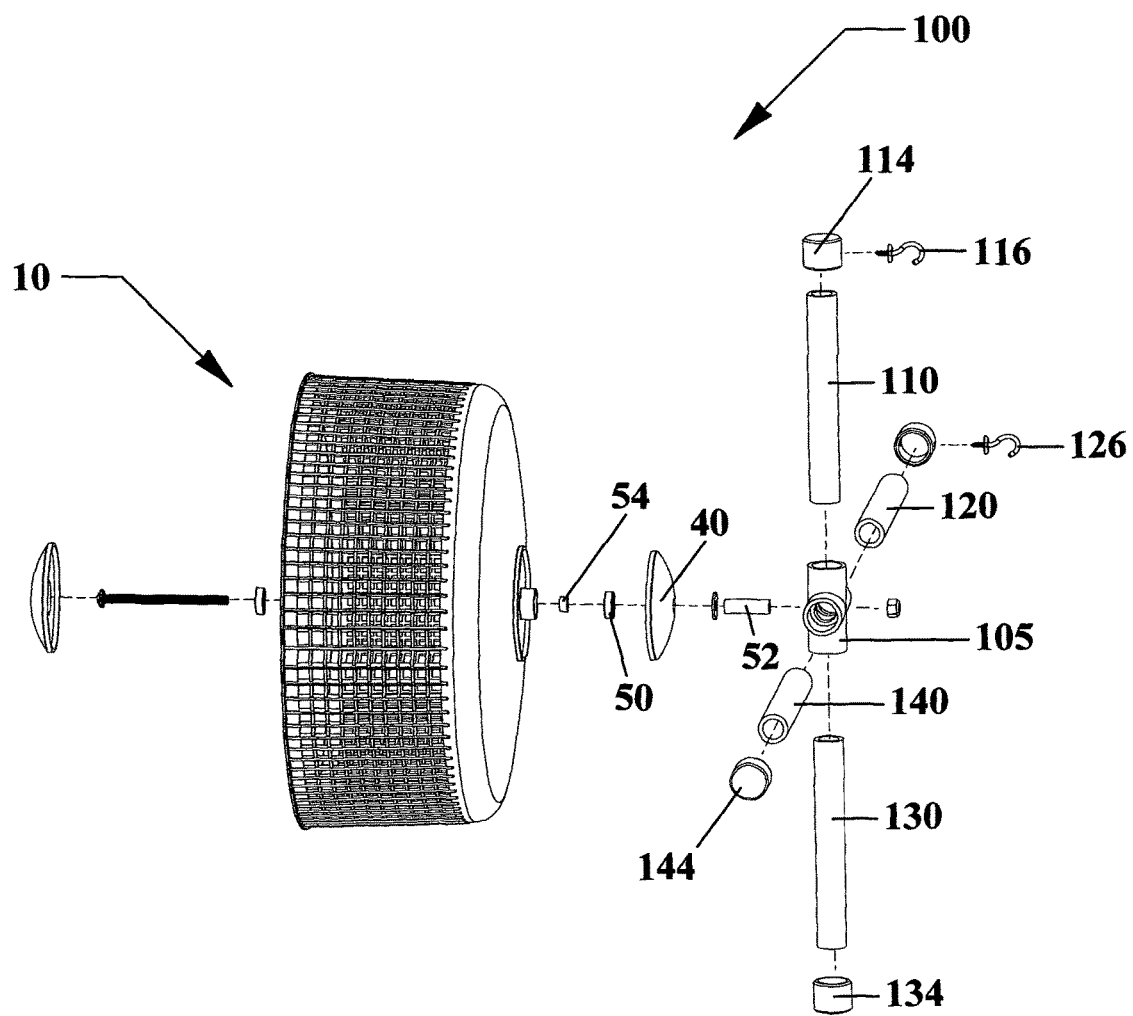
FIG. 11 is an exploded perspective view of the exercise wheel and stand of FIG. 9A.

FIG. 9A is a front right perspective view of a second embodiment 100 of the exercise wheel 10 and cross mount stand formed from a cross fitting 105 and cross tubes 110-140. FIG. 9B is rear left perspective view of the exercise wheel 10 and stand formed from a cross fitting 105 and cross tubes 110-140 of FIG. 9A. FIG. 10 a cross-sectional view of the exercise wheel 10 and stand formed from a cross fitting 105 and cross tubes 110-140 of FIG. 9B along arrows 10X. FIG. 11 is an exploded perspective view of the exercise wheel 10 and stand formed from a cross fitting 105 and cross tubes 110-140 of FIG. 9A.

Referring to FIGS. 9A-11, the second embodiment can include the same wheel 10 and related parts referenced in the first embodiment 1 shown and described in previous figures. The bushing 52 can fit against one side of the cross fitting 105 that can be formed from PVC and the like, with the nut 65 can attach about the threaded end of the fastener 60, similar to the attachment to the stand 70 in the preceding embodiment.

Attached into one side opening of the cross fitting 105 can be a first cross tube 110 with a first end cap 114 covering the outer exposed end. A first hook 116 can have a stem portion which threads into the end cap 114. Attached into another side opening of the cross fitting 105 can be a second cross tube 120 with a second end cap 124 covering the outer exposed end. A second hook 126 can have a stem portion which threads into the second end cap 124. A third tube 130 can be attached to a third side opening of the cross fitting 105, with end cap 134 covering an outer exposed end. And a fourth tube 140 can be attached to a fourth side opening of the cross fitting 105 with an end cap 144 covering an outer exposed end.

The hooks 116, 126 can allow for the second embodiment to be hung from wall mounted fasteners, such as nails, screws, hooks, wires and the like, that can be attached to wall type surfaces.

The hooks can also be used to attach the wheel 10 and cross mount 100 to the inside of a cage. Straps can also be used with or without the hooks to attach the cross mount to the cage.

The side mount 100 approximately 9½ inches diameter and approximately 5 inches deep. A Junior XMount is approximately 9½ inches diameter and 6 inches deep.

The full size wheel with the X mount can be approximately 12 and ½ inches wide and approximately 8 inches deep. The cross mount can be PVC, and include cable ties and hooks on the ends of the X mount. The X mount can help stabilize light weight cages. The X mount can be attached to the inner side cage walls by the hooks, and reinforced with the straps.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An exercise wheel and mount for small animals, comprising:
   a one-piece molded plastic wheel having a front ring and a rear wall with a cylindrical netted running surface forming the sidewall therebetween;
   a separate stand for supporting the wheel in an upright rotatable position;
   a rotation mechanism with a pair of spaced apart sets of stainless steel ball bearings for allowing the wheel to be rotatable relative to the stand, where the wheel is useful as an exercising wheel for small animals;
   a separate interior convex curved front cap inside of the wheel for attachment over a central axis in the rear wall, wherein one set of the pair of ball bearings being located between the interior convex curved front cap and the rear wall of the wheel; and
   a separate exterior rear cap outside of the wheel for attachment over the central axis in the rear wall, with another set of the pair of ball bearings between the rear wall of the wheel and the exterior rear cap, wherein the rear wall includes a front bevel shaped ring shaped edge which is adjacent to a perimeter edge of the separate interior convex curved front cap inside of the wheel, for a smooth transition therebetween.

2. The exercise wheel and mount of claim 1, wherein the netted running surface includes: openings between approximately ¼ inch to approximately 5/16 inch, wherein the openings are large enough for animal waste to pass through and small enough to keep feet, legs and tails of the small animals in the wheel.

3. The exercise wheel and mount of claim 1, wherein the one-piece wheel is formed from ABS plastic.

4. The exercise wheel and mount of claim 1, wherein the one-piece wheel is formed from polypropylene plastic.

5. The exercise wheel and mount of claim 1, wherein the one-piece wheel is formed from high density polyethylene (HDPE).

6. The exercise wheel and mount of claim 1, wherein the one-piece wheel is formed from nylon.

7. The exercise wheel and mount of claim 1, wherein the rotation mechanism further includes:
   a first stainless steel bushing between the sets of the stainless steel bearings; and
   a second stainless steel bushing between the exterior cap and the stand.

8. The exercise wheel and mount of claim 1, wherein the rear wall includes an outer convex raised shape to help prevent small animals from being trapped between the rear wall and the stand.

9. The exercise wheel and mount of claim 1, wherein the stand includes:
   a U shaped base with a post extending from the base to the rotation mechanism, wherein the stand supports the exercise wheel on a horizontal surface.

10. The exercise wheel and mount of claim 1, wherein the U shaped base includes:
    a vertical support post having an upper end attached to the rotation mechanism, and a lower end, attached to the U shaped base;
    a t coupler having an upper opening attached to the lower end of the support post, and having a pair of opposite facing side openings;
    a pair of rear support posts, each of the rear support posts attached to the opposite facing side openings of the t coupler;
    a pair of elbow couplers, each of the elbow couplers attached to exposed ends of the rear support posts; and
    a pair of parallel support leg posts, each of the parallel support leg posts attached to the pair of elbow couplers.

11. The exercise wheel and mount of claim 1, wherein the stand includes:
    a cross mount for supporting the rotation mechanism against a vertical surface; and
    hooks for attaching the cross mount to an inside of a cage.

12. The exercise wheel and mount of claim 11, wherein the cross mount includes:
    a cross fitting;
    a first tube attached to a first opening of the cross fitting;
    a first cap attached to an end of the first tube;
    a first hook attached to the first cap;
    a second tube attached to a second opening of the cross fitting;
    a second cap attached to an end of the second tube; and
    a second hook attached to the second cap.

13. The exercise wheel and mount of claim 12, wherein the cross mount further includes:
    a third tube attached to a third opening of the cross fitting;
    a third cap attached to an end of the third tube;
    a fourth tube attached to a fourth opening of the cross fitting; and
    a fourth cap attached to an end of the fourth tube.

14. The exercise wheel and mount of claim 1, wherein the rear wall further includes:
    a rear raised circular edge which is adjacent to a perimeter edge of the separate exterior convex curved rear cap outside of the wheel, for a smooth transition therebetween.

15. An exercise wheel and mount for small animals, comprising:
    a one-piece molded plastic wheel having a front ring and a rear wall with a cylindrical netted running surface forming the sidewall therebetween;
    a stand for supporting the wheel in an upright rotatable position;
    a rotation mechanism for allowing the wheel to be rotatable relative to the stand, where the wheel is useful as an exercising wheel for small animals;
    a separate interior convex curved front cap inside of the wheel for attachment over and for completing closing off a central axis opening in the rear wall, the convex curved front cap consisting of a continuous smooth contiguous front surface; and
    a separate exterior rear cap outside of the wheel for attachment over the central axis opening in the rear wall, wherein the rear wall includes a front bevel shaped ring shaped edge, which is adjacent to a perimeter edge of the separate interior convex curved front cap inside of the wheel, for a smooth transition therebetween wherein the rotation mechanism includes: a pair of spaced apart sets of ball bearings, wherein one set of the pair of ball bearings being located between the interior convex curved front cap and the rear wall of the wheel, and wherein another set of the pair of ball bearings being located between the rear wall of the wheel and the exterior rear cap; a first stainless steel bushing between the sets of ball bearings; and a second stainless steel bushing between the exterior cap and the stand.

16. The exercise wheel and mount of claim 15, wherein the rear wall includes an outer convex raised shape to help prevent small animals from being trapped between the rear wall and the stand.

17. The exercise wheel and mount of claim 15, wherein the rear wall further includes:
    a rear raised circular edge which is adjacent to a perimeter edge of the separate exterior convex curved rear cap outside of the wheel, for a smooth transition therebetween.

18. An exercise wheel and mount for small animals, comprising:
    a one-piece molded plastic wheel having a front ring and a rear wall with a cylindrical netted running surface forming the sidewall therebetween;
    a stand for supporting the wheel in an upright rotatable position;
    a rotation mechanism with a pair of spaced apart sets of ball bearings for allowing the wheel to be rotatable relative to the stand, where the wheel is useful as an exercising wheel for small animals;
    an interior convex front cap inside of the wheel for attachment over a central axis in the rear wall, wherein one set of the pair of ball bearings being located between the interior front cap and the rear wall of the wheel; and
    an exterior rear cap outside of the wheel for attachment over the central axis in the rear wall, with another set of the pair of ball bearings between the rear wall of the wheel and the exterior rear cap.

* * * * *